F. ROBERTS.
OIL CUP FOR WAGON WHEELS.
APPLICATION FILED JAN. 8, 1917.

1,243,978.

Patented Oct. 23, 1917.

Inventor
F. ROBERTS
H. S. Kiee
Attorney

UNITED STATES PATENT OFFICE.

FLAUZELLE ROBERTS, OF CENTER, TEXAS.

OIL-CUP FOR WAGON-WHEELS.

1,243,978.  Specification of Letters Patent.  Patented Oct. 23, 1917.

Application filed January 8, 1917. Serial No. 141,236.

*To all whom it may concern:*

Be it known that I, FLAUZELLE ROBERTS, a citizen of the United States, residing at Center, in the county of Shelby, State of Texas, have invented a new and useful Oil-Cup for Wagon-Wheels; and I do hereby declare the following to be a full, clear, and exact description of the invention, such as will enable others skilled in the art to which it appertains to make and use the same.

The present invention relates to a grease cup attachment for vehicle wheels, and has for its object to provide a device of this character which can be readily applied to the hub of any wagon wheel, and which will enable the wheel to be lubricated at any time without the necessity of jacking up the wheel and removing it from the axle.

Further objects of the invention are to provide a device of this character which is comparatively simple and inexpensive in its construction, which can be applied to the wheel without necessitating any material changes therein, and which will enable a supply of lubricant to be forced into the axle boxing and around the axle at any time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views by the same reference characters.

Figure 1:
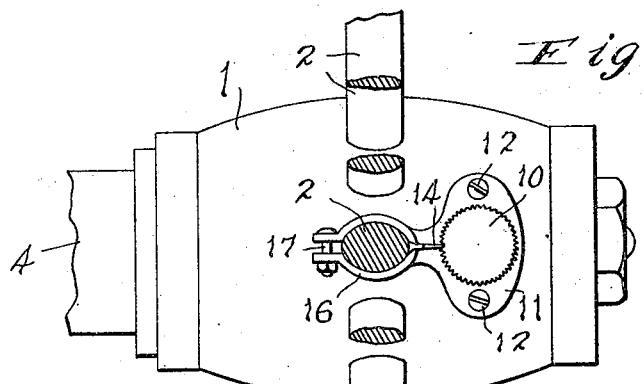
Figure 1 is a top plan view of a vehicle hub having a lubricating attachment constructed in accordance with the invention and applied thereto.
Figure 2:
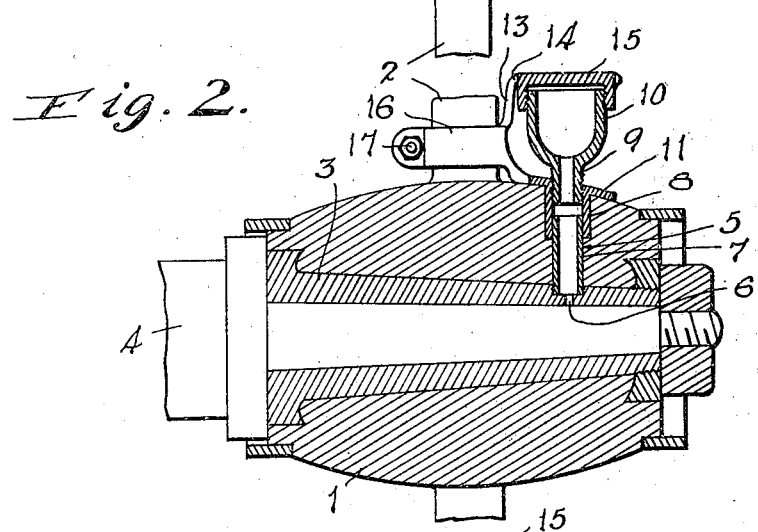
Fig. 2 is a vertical longitudinal sectional view through the same.
Figure 3:
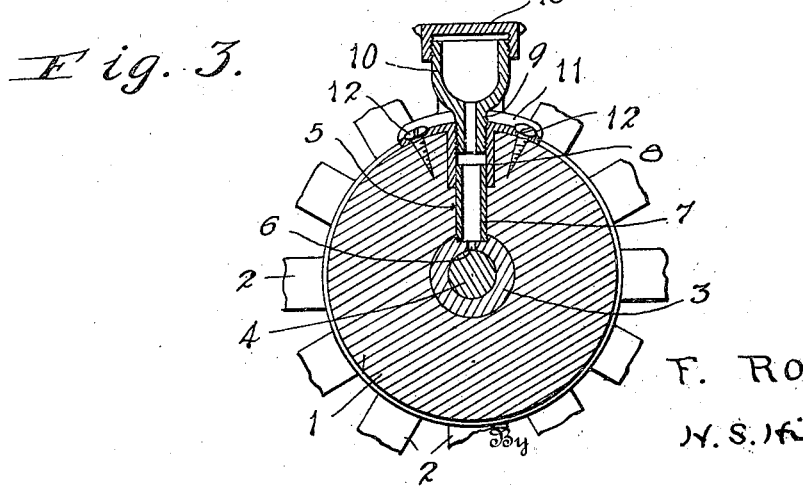
Fig. 3 is a transverse vertical sectional view.

For the purpose of illustration the invention is shown as applied to a wagon wheel of the conventional construction, including a hub 1 and spokes 2, the hub being provided with an axle boxing 3 and being mounted upon an axle 4. In carrying out the invention a radial opening 5 is bored in the hub 1 and carried a part of the way through the axle boxing 3, the lower end of the large opening 5 communicating with a small opening 6 which extends through the axle boxing and leads to the axle. A feed tube 7 is fitted within the opening 5 and has the lower end thereof threaded into the boxing 3. The upper end of the feed tube 7 telescopes within a bushing 8 which is fitted in the upper end of the opening 5 and which is internally threaded to receive the stem 9 of a grease cup 10. This bushing 8 is integral with a plate 11 which is adapted to fit upon the exterior of the hub 1 and may be secured thereto by suitable fastening means such as the screws 12. An extension 13 projects upwardly from the inner edge of the plate 11, and terminates in a spring arm 14 which engages the milled periphery of the cap 15 of the oil cup to prevent accidental rotation of the cap which might otherwise be caused by the jars and vibration when the vehicle is in motion. This upwardly projecting extension 13 is also provided with a pair of spoke engaging clamps 16 which are designed to extend around opposite sides of one of the spokes 2 and to be connected by a clamping bolt 17. The device is thus held securely in position, and there is no danger of its working loose and becoming lost. The cap 15 is designed to be filled with proper grease or lubricant in the usual manner, and this lubricant can be fed to the axle through the feed tube 7 at any time when it may become necessary to lubricate the axle, by merely screwing downwardly upon the cap 15. The wheels can thus be lubricated when the vehicle is heavily loaded, without the necessity of soiling the fingers or jacking up the vehicle to remove the wheels.

Having thus described the invention, what I claim as new and desire to secure by Letters Patent, is:—

1. The combination with a vehicle wheel having a radial opening extending through the hub and axle boxing thereof, of a plate fitting against the peripheral surface of the hub and provided with a bushing projecting into the opening of the hub, a grease cup fitted in the bushing, a cap threaded upon the grease cup, an extension projecting from one side of the plate and terminating in a spring arm which engages the cap to prevent accidental rotation thereof, and means upon the extension for gripping one of the wheel spokes to lock the plate in position.

2. The combination with a vehicle wheel having a radial opening extending through the hub and axle boxing thereof, of a plate fitted against the peripheral surface of the hub and formed with a bushing which projects into the opening of the hub, a grease cup fitted in the bushing, a cap threaded upon the grease cup, an integral extension projecting from one side of the plate and terminating in a spring arm which engages the cap to prevent accidental rotation thereof, and a pair of complemental spoke clamping jaws projecting from the extension and adapted to grip one of the wheel spokes to lock the device in position.

In testimony whereof I have signed my name to this specification in the presence of two subscribing witnesses.

FLAUZELLE ROBERTS.

Witnesses:
J. R. HINES,
I. H. ROBERTS.

Copies of this patent may be obtained for five cents each, by addressing the "Commissioner of Patents, Washington, D. C."